US009071086B2

(12) United States Patent
Lee

(10) Patent No.: US 9,071,086 B2
(45) Date of Patent: Jun. 30, 2015

(54) INVERTER, INVERTER COMMUNICATION SYSTEM, COMMUNICATION METHOD THEREOF

(75) Inventor: Bong Ki Lee, Anyang-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 188 days.

(21) Appl. No.: 13/484,027

(22) Filed: May 30, 2012

(65) Prior Publication Data

US 2012/0313558 A1    Dec. 13, 2012

(30) Foreign Application Priority Data

Jun. 8, 2011 (KR) .................... 10-2011-0055336

(51) Int. Cl.
*H02P 1/54* (2006.01)
*H02M 1/00* (2007.01)
*H02J 13/00* (2006.01)

(52) U.S. Cl.
CPC .... *H02J 13/0013* (2013.01); *H02M 2001/0012* (2013.01); *Y02B 90/2607* (2013.01); *Y04S 40/12* (2013.01)

(58) Field of Classification Search
USPC .................................................. 318/51, 53
See application file for complete search history.

(56) References Cited

U.S. PATENT DOCUMENTS

| 7,884,500 | B2* | 2/2011 | Kernahan | 307/52 |
| 2004/0128609 | A1* | 7/2004 | Kurobe et al. | 714/776 |
| 2006/0022704 | A1* | 2/2006 | Leijten-Nowak | 326/40 |
| 2006/0083039 | A1* | 4/2006 | Oliveira et al. | 363/131 |
| 2006/0251028 | A1* | 11/2006 | Nagata et al. | 370/338 |
| 2009/0290393 | A1* | 11/2009 | Angerer et al. | 363/49 |
| 2011/0029137 | A1* | 2/2011 | Yasohara et al. | 700/275 |
| 2011/0062900 | A1* | 3/2011 | Shin et al. | 318/51 |
| 2011/0283272 | A1* | 11/2011 | Angerer et al. | 717/168 |
| 2012/0089260 | A1* | 4/2012 | Krohne et al. | 700/286 |

FOREIGN PATENT DOCUMENTS

CN    101523714    9/2009

OTHER PUBLICATIONS

The State Intellectual Property Office of the People's Republic of China Application Serial No. 201210181485.X, Office Action dated Jul. 29, 2014, 10 pages.

* cited by examiner

*Primary Examiner* — Paul Ip
*Assistant Examiner* — Devon Joseph
(74) *Attorney, Agent, or Firm* — Lee, Hong, Degerman, Kang & Waimey

(57) ABSTRACT

An inverter communication system is provided. The system includes a plurality of inverters connected to each other through a communication line, and assigned with different original identifiers for mutual distinction, wherein each of the plurality of inverters: receives a data frame transmitted through a previous inverter; selectively transmits the received data frame to a subsequent inverter; generates a data frame to be transmitted when data to be transmitted to a specific inverter occur; and transmits the generated data frame to a subsequent inverter.

10 Claims, 7 Drawing Sheets

(Prior Art)

| DESTINATION INFORMATION | DEPARTURE INFORMATION | Frame Type | Data Length | Data | CRC 16 |
|---|---|---|---|---|---|
| 210 | 220 | 230 | 240 | 250 | 260 |

INVERTER, INVERTER COMMUNICATION SYSTEM, COMMUNICATION METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2011-0055336, filed on Jun. 8, 2011, the contents of which are all hereby incorporated by reference herein in its entirety.

BACKGROUND

The present disclosure relates to an inverter, and more particularly, to a communication method in an inverter system including a plurality of inverts.

In modern industries, most of driving devices include motors, and inverters are required to precisely control the motors. Additionally, a Programmable Logic Controller (PLC) is currently used as a method of controlling a plurality of inverters.

Moreover, motors are indispensable across all industries, and therefore, the need for inverters is increased. As devices for efficiently controlling motors, inverters reduce power consumption of motors and increase their energy efficiency.

Recently, linking and operating a plurality of motors become more frequent, and accordingly, a linking operation by sharing information on a plurality of inverters becomes more frequent.

As mentioned above, when inverters are in linking operations, a plurality of inverters need to exchange information data or command data with each other in order to smoothly drive motors.

FIG. 1 is a schematic view illustrating a configuration of a related art inverter system.

Referring to FIG. 1, an inverter communication system includes a communication device 10, a plurality of inverters 20-1, 20-2, 20-3, and 20-4, and a plurality of motors 30-1, 30-2, 30-3, and 30-4 driven by controls of the inverters 20-1, 20-2, 20-3, and 20-4.

The communication device 10 operates as a communication master for communication between the plurality of inverters 20-1, 20-2, 20-3, and 20-4.

The plurality of inverters 20-1, 20-2, 20-3, and 20-4 serve as a slave device to perform a communication with the communication device 10 through a communication line. Additionally, the plurality of inverters 20-1, 20-2, 20-3, and 20-4 and the communication device 10 exchange mutual data with each other through the communication line.

The communication device 10 collects data through communication with each of the plurality of inverters 20-1, 20-2, 20-3, and 20-4, and controls each of the plurality of inverters 20-1, 20-2, 20-3, and 20-4 by using the collected data.

In the same manner, the communication device 10 may efficiently control the plurality of inverters 20-1, 20-2, 20-3, and 20-4 in a complex system or a large scale system.

However, if there are a plurality of motors 30-1, 30-2, 30-3, and 30-4 (for example, two to five motors), the structure of the inverter system becomes complex. Accordingly, operators may make errors easily.

Additionally, since the inverter system includes the additional communication device 10, system building costs are increased.

Additionally, since the communication device 10 needs to be installed in a different place than a place where the plurality of inverters 20-1, 20-2, 20-3, and 20-4 are installed, installation space may be wasted.

Moreover, since the inverters 20-1, 20-2, 20-3, and 20-4 communicate with the communication device 10 that operates as the master, a communication line used for communicating with the communication device 10 becomes longer. Therefore, errors may occur in communication data according to external environmental conditions such as noise.

SUMMARY

Embodiments provide an efficient communication method in a system including a plurality of inverters.

Embodiments also provide a communication method in which one of a plurality of inverters operates as a master to communicate with another inverter.

In one embodiment, an inverter communication system includes: a plurality of inverters connected to each other through a communication line, and assigned with different original identifiers for mutual distinction, wherein each of the plurality of inverters: receives a data frame transmitted through a previous inverter; selectively transmits the received data frame to a subsequent inverter; generates a data frame to be transmitted when data to be transmitted to a specific inverter occur; and transmits the generated data frame to a subsequent inverter.

In another embodiment, an inverter includes: a data reception unit receiving a data frame transmitted through a previous inverter; a data transmission unit selectively transmitting the data frame received through the data reception unit to a subsequent inverter; and a control unit confirming destination information in the data frame when the data frame is received, and selectively transmitting the data frame to a subsequent inverter by using the confirmed destination information, The details of one or more embodiments are set forth in the accompanying drawings and the description below. Other features will be apparent from the description and drawings, and from the claims.

BRIEF DESCRIPTION OF THE DRAWINGS

FIG. 4 is a schematic view illustrating a format of a data frame according to an embodiment.

DETAILED DESCRIPTION OF THE EMBODIMENTS

Reference will now be made in detail to the embodiments of the present disclosure, examples of which are illustrated in the accompanying drawings.

Suggested embodiments will be described.

Figure 1:
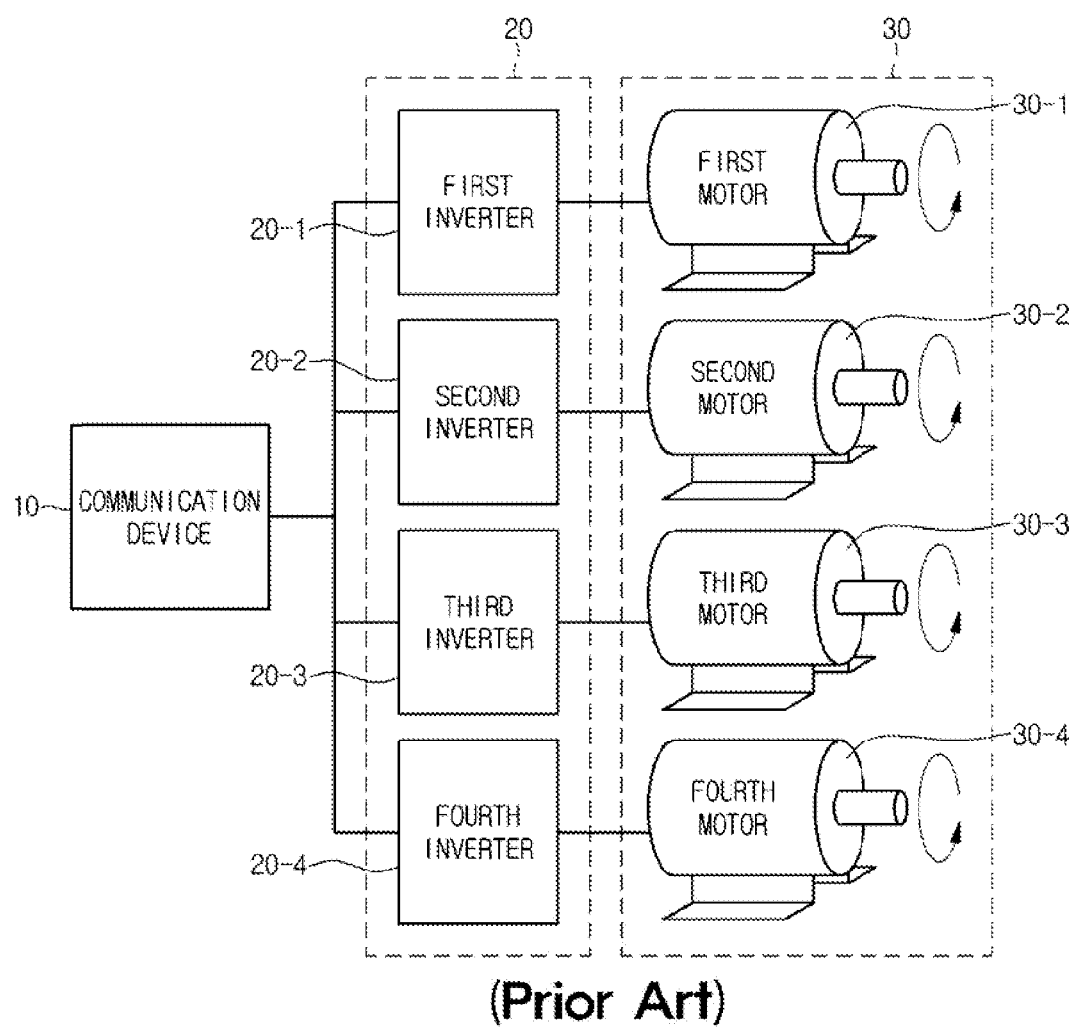
FIG. 1 is a schematic view illustrating a configuration of a related art inverter communication system.
Figure 2:
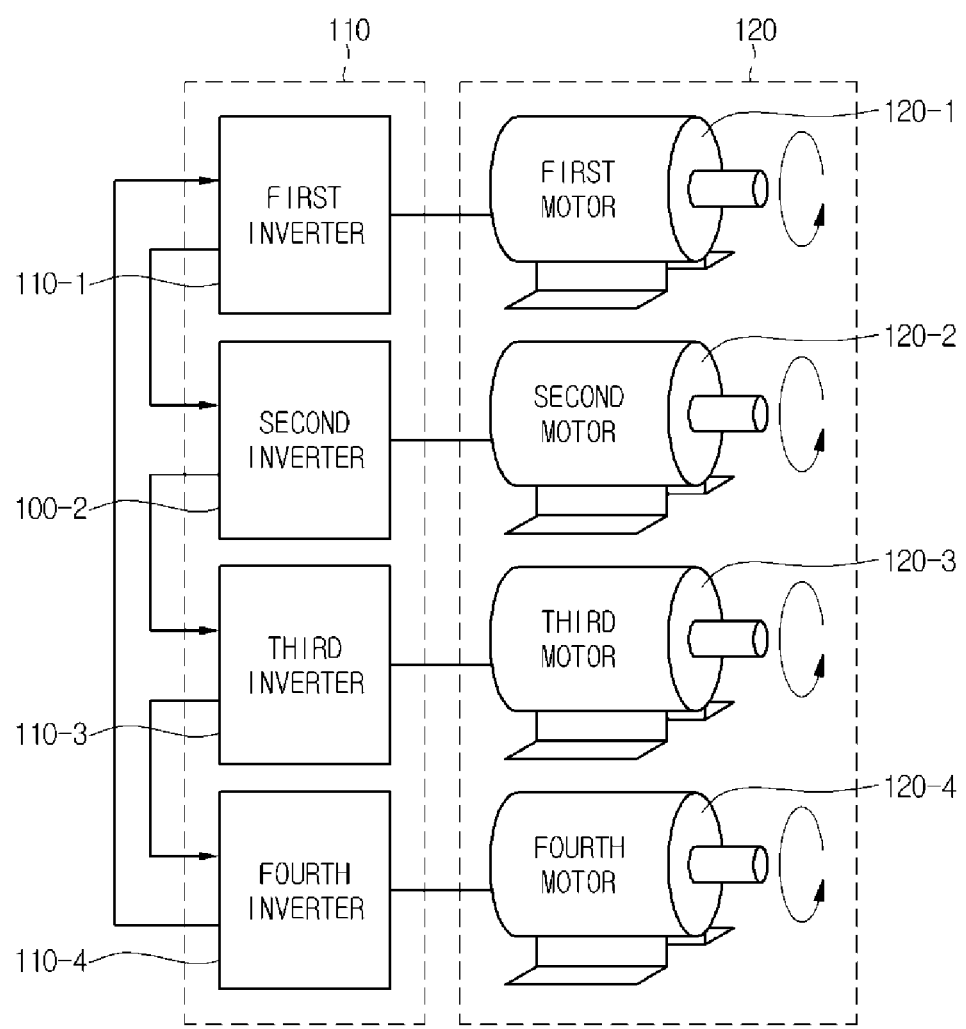
FIG. 2 is a schematic view illustrating a configuration of an inverter communication system according to an embodiment.

FIG. 2 is a schematic view illustrating a configuration of an inverter communication system according to an embodiment.

Referring to FIG. 2, the inverter communication system includes an inverter 110, and a motor 120 operated by a control of the inverter 110.

The inverter 110 includes a first inverter 110-1, a second inverter 110-2, a third inverter 110-3, and a fourth inverter 110-4.

Additionally, the motor 120 includes a first motor 120-1 operated by a control of the first inverter 110-1, a second motor 120-2 operated by a control of the second inverter 110-2, a third motor 120-3 operated by a control of the third inverter 110-3, and a fourth motor 120-4 operated by a control of the fourth inverter 110-4.

The first inverter 110-1, the second inverter 110-2, the third inverter 110-3, and the fourth inverter 110-4 are mutually connected to each other through a communication lines.

That is, the first inverter 110-1 is connected to the second inverter 110-2; the second inverter 110-2 is connected to the third inverter 110-3; the third inverter 110-3 is connected to the fourth inverter 110-4; and the fourth inverter 110-4 is connected to the first inverter 110-1, on the basis of the transmission line.

Accordingly, the first inverter 110-1 transmits a data frame to the second inverter 110-2; the second inverter 110-2 transmits a data frame to the third inverter 110-3; the third inverter 110-3 transmits a data frame to the fourth inverter 110-4; and the fourth inverter 110-4 transmits a data frame to the first inverter 110-1.

At this point, the transmitted data frame may be a data frame generated from an inverter itself (i.e., a transfer subject), or unlike that, may be a data frame generated from another and transmitted through an adjacent inverter.

Accordingly, the first inverter 110-1, the second inverter 110-2, the third inverter 110-3, and the fourth inverter 110-4 that constitute the inverter system may perform mutual data communication through the communication line.

Additionally, according to data communication environments, each of the first inverter 110-1, the second inverter 110-2, the third inverter 110-3, and the fourth inverter 110-4 may operate as a master to perform communication.

That is, according to data communication environments, the first inverter 110-1 may operate as a master; the second inverter 110-2 may operate as a master; the third inverter 110-3 may operate as a master; and the fourth inverter 110-4 may operate as a master.

At this point, the transmitted data frame includes inverter information corresponding to a final destination where the data frame arrives finally and inverter information corresponding to a departure where the data frame is transmitted initially That is, when the data frame is simply transmitted between a plurality of inverters, information that the data frame is transmitted to which one of the plurality of inverters (i.e., destination information) needs to be included in the data frame.

Additionally, even if the data frame includes destination information, due to transmission errors, the data frame may continuously remain on a communication line between the plurality of inverters.

That is, if destination information in the transmitted data frame is damaged or the data frame itself is damaged, since there is no final destination of the data frame, the data frame remains between the plurality of inverters.

Accordingly, the data frame needs to include departure information corresponding to an inverter that generates the data frame and initially transmits the generated data frame.

For this, first, original identifiers are assigned to the first inverter 110-1, the second inverter 110-2, the third inverter 110-3, and the fourth inverter 110-4, respectively.

Figure 3:
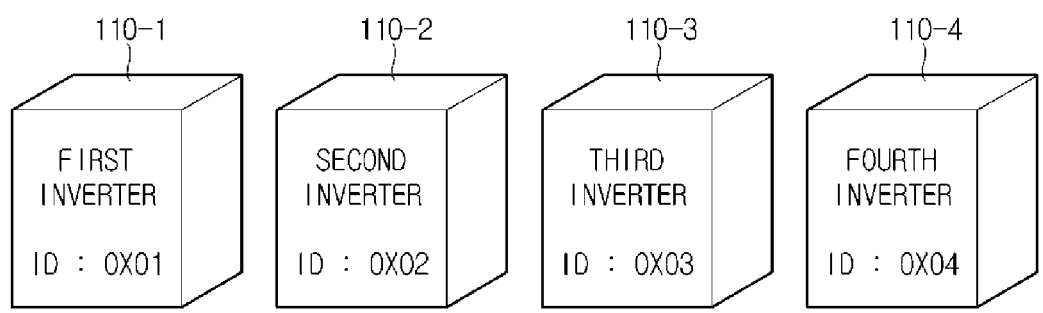
FIG. 3 is a view illustrating an original identifier assigned to each inverter according to an embodiment.

FIG. 3 is a view illustrating an original identifier assigned to an inverter constituting an inverter system according to an embodiment.

Referring to FIG. 3, different original identifiers are assigned to the first inverter 110-1, the second inverter 110-2, the third inverter 110-3, and the fourth inverter 110-4, respectively, all of which constitute the inverter system.

That is, the first inverter 110-1 has the original identifier of '0x01'; the second inverter 110-1 has the original identifier of '0x02'; the third inverter 110-3 has the original identifier of '0x03'; and the fourth inverter 110-4 has the original identifier of '0x04';

The original identifiers are information to distinguish and identify each inverter, and the data frame includes information corresponding to the original identifier assigned to each of the inverters.

That is, the data frame includes destination information that refers to an original identifier of an inverter corresponding to a final destination and departure information that refers to an original identifier corresponding to an initial departure.

That is, each of the inverters generates the data frame if a data frame to be transmitted is needed, and inserts departure information including an original identifier assigned to itself into the generated data frame.

Moreover, each of the inverters inserts destination information including an original identifier of an inverter corresponding to a final destination where the generated data frame arrives into the data frame.

FIG. 4 is a schematic view illustrating a format of a data frame according to an embodiment.

Referring to FIG. 4, the data frame 200 includes fields such as destination information 210, departure information 220, a Frame Type 230, a Data Length 240, Data 250 and a CRC16 260.

The destination information 210 includes an original identifier of an inverter corresponding to a final destination of the data frame 200. At this point, the field of the destination information 210 may consist of 2 bits. For example, if the data frame 200 to be transmitted from the first inverter 110-1 to the fourth inverter 110-4 is generated, the field of the destination information 210 includes the original identifier of '0x04' assigned to the fourth inverter 110-4.

The destination information 210 is used to stably transmit the data frame 200 to a specific inverter corresponding to a final destination.

The departure information 220 includes an original identifier of an inverter (i.e., a departure of the data frame 200) that generates the data frame 200. At this point, the field of the departure information 220 may consist of 2 bits. For example, if the data frame 200 to be transmitted from the second inverter 110-2 to the third inverter 110-3 is generated, the field of the departure information 220 includes the original identifier of '0x02' assigned to the second inverter 110-2.

The departure information 220 may prevent the data frame 220 from continuously remaining on a communication line due to communication errors.

The Frame Type 230 includes information on kinds of data in the data frame 200.

The Data Length 240 includes information on the length of the data frame 200.

The Data 250 includes data that are actually delivered to a specific inverter.

The data in the field of the Data 250 may include basic information data including at least one of a driving direction, a driving status, and trip of an inverter, and command data including at least one of DC-link voltage, output voltage, output current, output frequency, and output power of an inverter.

The CRC16 260 includes information used for checking errors in the data frame 200.

As mentioned above, according to an embodiment, since the destination information 210 is added to the data frame 200, the data frame 200 is stably transmitted to an inverter corresponding to a final destination.

Additionally, since the departure information 220 is added to the data frame 200, the situation that the data frame 200 continuously remains on a communication line between the inverters due to communication errors may be prevented in advance.

Hereinafter, an inverter constituting the above inverter system and a communication process of the inverter will be described in more detail.

Figure 5:
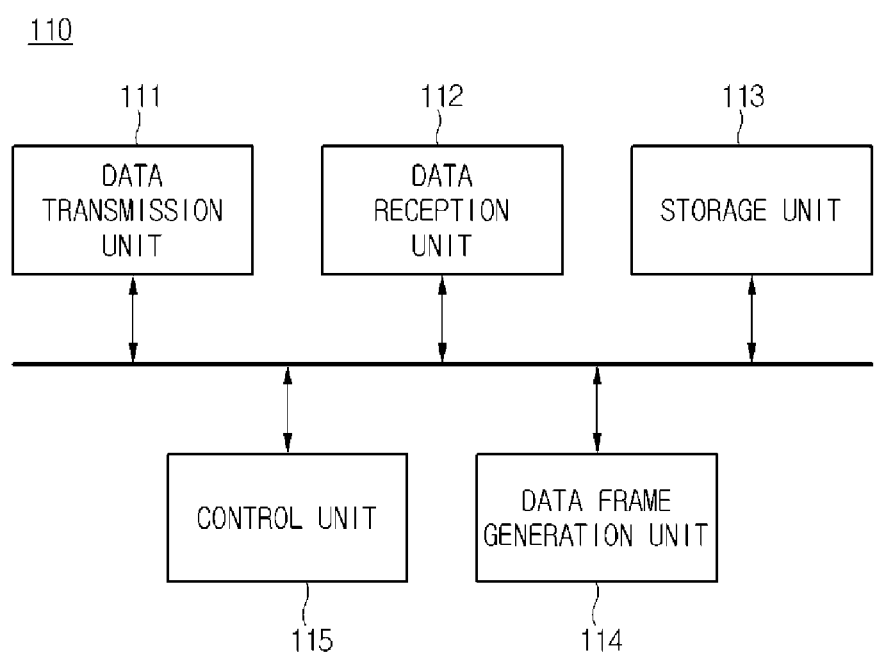
FIG. 5 is a schematic view illustrating a configuration of an inverter according to an embodiment.

FIG. 5 is a schematic view illustrating a configuration of an inverter according to an embodiment.

Referring to FIG. 5, the inverter 110 includes a data transmission unit 111, a data reception unit 112, a storage unit 113, a data frame generation unit 114, and a control unit 115.

FIG. 5 may illustrate a configuration of one inverter among the first inverter 110-1, the second inverter 110-2, the third inverter 110-3, and the fourth inverter 110-4.

The data transmission unit 111 transmits a data frame to another adjacent inverter.

That is, the data transmission unit 111 transmits a data frame to an adjacent inverter connected to a communication line, i.e., the subsequent inverter having the subsequent original identifier assigned based on a current inverter having its own original identifier.

At this point, the data frame transmitted through the data transmission unit 111 may be a data frame generated from the data frame generation unit 114, or may be a data frame transmitted from a previous inverter having a previous original identifier assigned into a current inverter having its own original identifier.

The data transmission unit 112 receives a data frame transmitted from another adjacent inverter.

The storage unit 113 stores various programs and information necessary for driving the inverter 110. Especially, the storage unit 113 stores an original identifier assigned to its inverter.

The data frame generation unit 114 generates a data frame that is to be transmitted to an adjacent inverter.

That is, the data frame generation unit 114 generates a data frame having the same format as FIG. 4. At this point, the departure information of the generated data frame includes its own original identifier. Since the departure information corresponds to the information on the departure of the data frame, that is, the original identifier of an inverter that generates the data frame, the data frame generation unit 114 constitutes the departure information by using the original identifier assigned to its own inverter.

The control unit 115 controls general operations of the inverter 110.

Especially, while the control unit 115 controls an operation of a motor, in case that data need to be transmitted to another inverter, a data frame to be transmitted to the other inverter is generated from the data frame generation unit 114.

At this point, the control unit 15 confirms the original identifier of an inverter to which the data frame is transmitted. Accordingly, the control unit 15 creates destination information of the data frame on the basis of the confirmed original identifier, and creates departure information of the data frame on the basis of the original identifier of its own inverter.

Additionally, on receiving the data frame transmitted through the data reception unit 112, the control unit 115 confirms the destination information in the data frame.

That is, the control unit 115 confirms whether an original identifier in the received destination information of the data frame is that assigned to its own inverter. Accordingly, the control unit 115 applies data in the data field of the data frame when the original identifier in the received destination information of the data frame is identical to that assigned to its own inverter.

Moreover, the control unit 115 transmits the received data frame to an adjacent inverter when the original identifier in the received destination information of the data frame is different from that assigned to its own inverter. At this point, the inverter serves to relay the transmission of the data frame.

At this point, the control unit 115 confirms departure information in the data frame before transmitting the received data frame to adjacent another inverter, and accordingly, confirms whether the departure information corresponds to the original identifier assigned to its own inverter.

That is, the control unit 115 confirms whether the received data frame is a data frame generated through the its own inverter.

Moreover, the control unit 115 determines that the data frame remains on a communication line due to communication errors when the received data frame corresponds to a data frame generated through its own inverter, and accordingly, deletes the received data frame without transmitting it to another inverter.

That is, the control unit 115 transmits the data frame to adjacent another inverter when departure information in the received data frame is different from an original identifier in its own inverter.

As mentioned above, the inverter 110 transmits the received data frame to adjacent another inverter by using departure information and destination information in a data frame.

Furthermore, once data to be transmitted to another inverter occur, the inverter 110 generates a data frame including destination information having an original identifier of an inverter to which the data is to be transmitted, and transmits the data frame to adjacent another inverter.

Since the inverter implements a communication system with adjacent another inverter through a communication line in a ring form, an efficient communication system may be implemented at low cost in an inverter linking system, and all inverters may operate as a master. The system configuration becomes easier.

Figure 6:
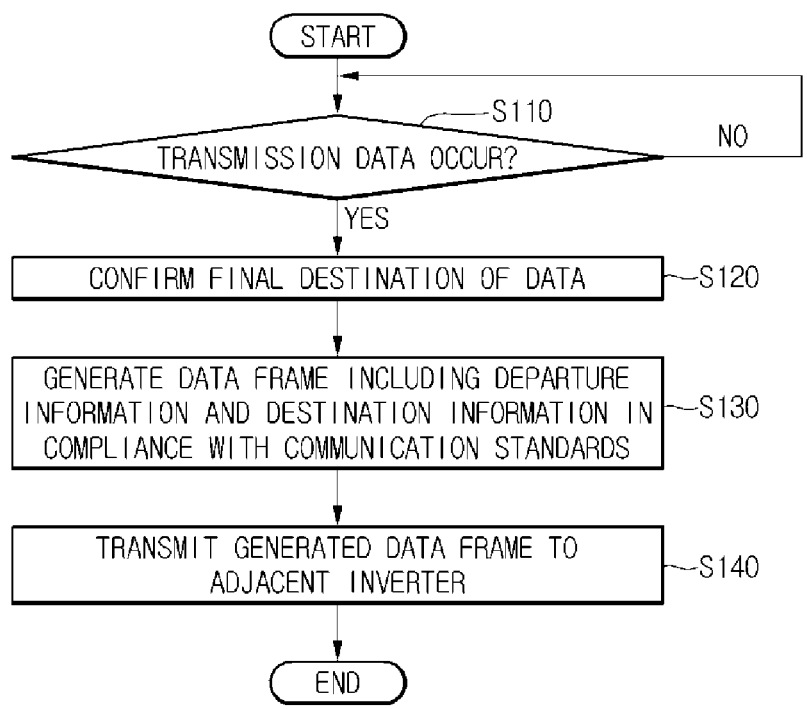
FIGS. 6 and 7 are flowcharts illustrating a communication method of an inverter communication system according to an embodiment.
Figure 7:
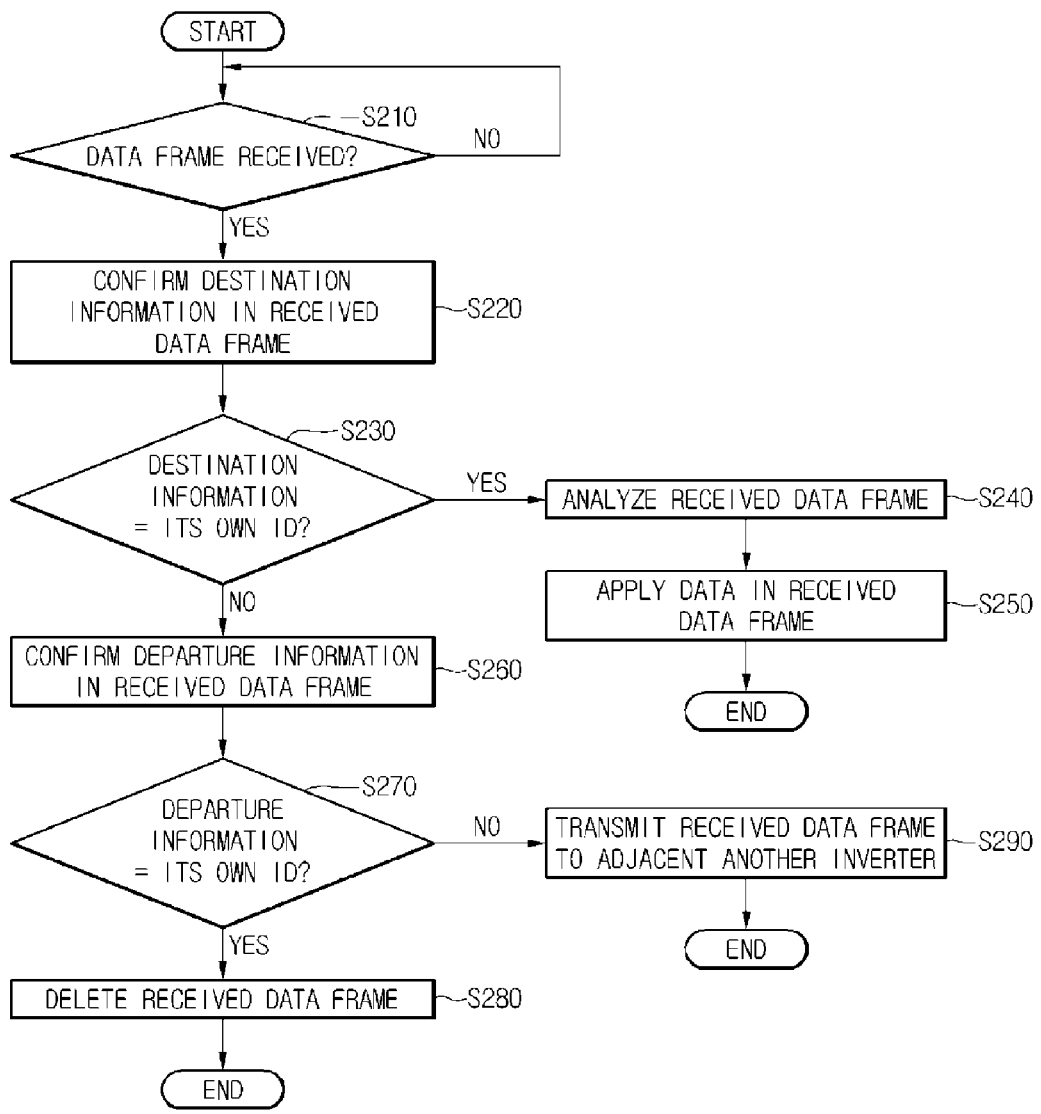

FIGS. 6 and 7 are flowcharts illustrating a communication method of an inverter communication system according to an embodiment.

FIG. 6 is the flowchart illustrating operations when data that are to be transmitted from its own inverter into another specific inverter occur. FIG. 7 is the flowchart illustrating operations when a data frame is transmitted from another inverter into its own inverter.

Hereinafter, FIG. 6 will be described on the assumption that operations are performed in the first inverter 110-1. However, the operations of FIG. 6 may be performed in any one of the second inverter 110-2, the third inverter 110-3, and the fourth inverter 110-4, not in the first inverter 110-1.

Referring to FIG. 6, first, the first inverter 110-1 confirms whether transmission data to be transmitted to another inverter occurs during an operation control of the first motor 120-1 in operation S110.

That is, the first inverter 110-1 confirms whether an event for transmitting information data including at least one of a driving direction, a driving status, and trip of an inverter, which is to be transmitted to another inverter, or command data including at least one of DC-link voltage, output voltage, output current, output frequency, and output power of an inverter occurs.

On the basis of the determination result in operation S110, if transmission data to be transmitted to another inverter occurs, the first inverter 110-1 confirms the original identifier of an inverter to which the transmission data are transmitted. For example, if transmission data to be transmitted from the first inverter 110-1 to the third inverter 110-3 occur, the first inverter 110-1 confirms the original identifier assigned to the third inverter 110-3 in operation S120.

The original identifier is stored in the storage unit 113 of the inverter 110.

The first inverter 110-1 confirms the original identifier of an inverter to which the transmission data are transmitted, and creates destination information by using the confirmed original identifier.

Additionally, the first inverter 110-1 creates departure information by using an original identifier assigned to its own inverter, and generates a data frame including the destination information and the departure information in operation S130.

That is, the first inverter 110-1 generates a data frame, which includes departure information that has an original identifier of '0x01' assigned to itself, destination information that has an original identifier of '0x03' assigned to the third inverter 110-3, and data that are to be transmitted to the third inverter 110-3.

Then, the first inverter 110-1 transmits the generated data frame to adjacent another inverter connected to a communication line in operation S140.

That is, the first inverter 110-1 transmits the generated data frame to the second inverter 110-2 connected through the communication line.

Hereinafter, a communication process of the above transmitted data frame will be described.

Hereinafter, FIG. 7 will be described on the assumption that operations are performed in the second inverter 110-2. However, it is apparent that the operations may be performed in the first, third, and fourth inverters.

Referring to FIG. 7, the second inverter 110-2 confirms whether a data frame is received through an adjacent inverter in operation S210.

That is, the control unit 115 of the second inverter 110-2 confirms whether the data frame is received through the data reception unit 112. That is, the second inverter 110-2 confirms whether the data frame is received through the first inverter 110-1.

On the basis of the determination result in operation S210, if the data frame is received in the second inverter 110-2, the second inverter 110-2 confirms the destination information in the received data frame in operation S220.

That is, the second inverter 110-2 confirms the original identifier of an inverter corresponding to the final destination of the data frame by using the destination information in the data frame.

Then, the second inverter 110-2 determines whether the confirmed original identifier of the inverter corresponding to the final destination is identical to its own identifier in operation S230.

On the basis of the determination result in operation S230, if the confirmed original identifier of the inverter corresponding to the final destination is identical to its own identifier, the second inverter 110-2 analyzes the received data frame in operation S240. That is, the second inverter 110-2 analyzes a data field in the data frame when the final destination of the received data frame is its own inverter.

Moreover, the second inverter 110-2 applies data in the analyzed data field in order to drive the second motor 120-2 in operation S250.

Moreover, on the basis of the determination result in operation S230, if the confirmed original identifier of the inverter corresponding to the final destination is not identical to its own identifier, the second inverter 110-2 confirms the departure information in the received data frame in operation S260.

That is, the second inverter 110-2 confirms the original identifier of an inverter that initially transmits the received data frame, that is, the original identifier of an inverter that generates the data frame.

When the original identifier of an inverter that initially transmits the data frame is confirmed, the second inverter 110-2 determines whether the confirmed original identifier is identical to its own original identifier in operation S270. That is, the second inverter 110-2 determines whether the received data frame is a data frame generated by the second inverter itself 110-2.

When the received data frame is generated by the second inverter 110-2 itself, the second inverter 110-2 deletes the received data frame in operation S280.

That is, if the received data frame is generated by the second inverter 110-2 itself, the second inverter 110-2 determines that the data frame remains on a communication line due to communication errors, and accordingly, deletes the received data frame.

Additionally, if the received data frame is not generated by the second inverter 110-2 itself, the second inverter 110-2 transmits the received data frame to adjacent another inverter, that is, the third inverter 110-3.

Then, when the data frame is transmitted from the second inverter 110-2 to the third inverter 110-3, the third inverter 110-3 performs operations S210 to S290 of FIG. 7.

According to embodiments, an efficient communication system may be implemented at low cost in an inverter linking system, and all inverters may operate as a master. The system configuration becomes easier.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An inverter communication system comprising:
a plurality of inverters connected to each other through a communication line, and assigned with different original identifiers for mutual distinction,
wherein each of the plurality of inverters is configured to:
generate a data frame to be transmitted when data to be transmitted to a specific inverter occur;
transmit the generated data frame to a subsequent inverter;
determine whether a data frame is received via a first adjacent inverter,
wherein the received data frame comprises destination information including an original identifier of an inverter where the data frame arrives finally and departure information including an original identifier of an inverter that generates and transmits the data frame initially;

confirm the destination information included in the received data frame when the data frame is received;

determine whether the confirmed destination information is identical to its own original identifier;

drive a motor using data in the received data frame when the confirmed destination information is identical to its own original identifier;

confirm the departure information included in the received data frame when the confirmed destination information is not identical to its own original identifier;

determine whether the confirmed departure information is identical to its own original identifier;

delete the received data frame when the confirmed departure information is identical to its own original identifier; and transmit the received data frame to a second adjacent inverter when the confirmed departure information is not identical to its own original identifier.

2. The inverter communication system according to claim 1, wherein each of the plurality of inverters is further configured to:

operate as a master to generate the data frame to be transmitted when the data to be transmitted to the specific inverter occur; and transmit the generated data frame to the subsequent inverter.

3. The inverter communication system according to claim 1, wherein the first adjacent inverter is a previous inverter including an assigned original identifier that is prior to an assigned original identifier of a current inverter, and the subsequent inverter is an inverter including an assigned original identifier that is subsequent to the assigned original identifier of the current inverter.

4. The inverter communication system according to claim 1, wherein the data frame comprises information data including at least a driving direction, a driving state, or a trip state of an inverter and command data including at least a DC-link voltage, an output voltage, an output current, an output frequency, or an output power of an inverter.

5. The inverter communication system according to claim 1, wherein each of the plurality of inverters is operated as a master to perform communication.

6. An inverter comprising:

a data reception unit receiving a data frame transmitted via a previous inverter;

a data transmission unit selectively transmitting the received data frame to a subsequent inverter;

a data frame generation unit generating a data frame to be transmitted to a specific inverter when data to be transmitted to the specific inverter occur; and a control unit configured to:

cause selective transmission of the data frame to a subsequent inverter;

determine whether a data frame is received from a first adjacent inverter, wherein the received data frame comprises destination information including an original identifier of an inverter where the data frame arrives finally and departure information including an original identifier of an inverter that generates and transmits the data frame initially;

confirm the destination information included in the received data frame when the data frame is received;

determine whether the confirmed destination information is identical to its own original identifier;

drive a motor using data in the received data frame when the confirmed destination information is identical to its own original identifier;

confirm the departure information included in the received data frame when the confirmed destination information is not identical to its own original identifier;

determine whether the confirmed departure information is identical to its own original identifier;

delete the received data frame when the confirmed departure information is identical to its own original identifier; and cause transmission of the received data frame to a second adjacent inverter when the confirmed departure information is not identical to its own original identifier.

7. A communication method of an inverter, the method comprising:

receiving a data frame transmitted from a first adjacent inverter, wherein the received data frame comprises destination information including an original identifier of an inverter where the data frame arrives finally and departure information including an original identifier of an inverter that generates and transmits the data frame initially;

confirming the destination information included in the received data frame when the data frame is received;

determining whether the confirmed destination information is identical to its own original identifier;

driving a motor using data in the received data frame when the confirmed destination information is identical to its own original identifier;

confirming the departure information included in the received data frame when the confirmed destination information is not identical to its own original identifier;

determining whether the confirmed departure information is identical to its own original identifier;

deleting the received data frame when the confirmed departure information is identical to its own original identifier; and transmitting the received data frame to a second adjacent inverter when the confirmed departure information is not identical to its own original identifier.

8. The method according to claim 7, further comprising:

generating a data frame to be transmitted to a specific inverter when data to be transmitted to the specific inverter occur; and inserting destination information corresponding to the inverter into the generated data frame; and inserting departure information corresponding to the inverter into the generated data frame.

9. The method according to claim 7, wherein the data frame received from the first adjacent inverter is a data frame generated by itself or a data frame generated by another inverter.

10. The method according to claim 7, wherein each of the inverter corresponding to the destination information of the data frame and the inverter corresponding to the departure information of the data frame is operated as a master to perform communication.

* * * * *